(12) United States Patent
DeMartini et al.

(10) Patent No.: US 7,516,016 B2
(45) Date of Patent: Apr. 7, 2009

(54) METHOD FOR IMPROVING PREDICTION OF THE VIABILITY OF POTENTIAL PETROLEUM RESERVOIRS

(76) Inventors: David C. DeMartini, 11714 Spriggs Way, Houston, TX (US) 77024; Michael Edwin Glinsky, 4209 Case St., Houston, TX (US) 77005

(*) Notice: Subject to any disclaimer, the term of this patent is extended or adjusted under 35 U.S.C. 154(b) by 50 days.

(21) Appl. No.: 11/449,965

(22) Filed: Jun. 9, 2006

(65) Prior Publication Data

US 2007/0288214 A1 Dec. 13, 2007

(51) Int. Cl.
*G06F 19/00* (2006.01)
(52) U.S. Cl. .......................................... 702/14; 703/10
(58) Field of Classification Search ................ 702/14, 702/18, 6; 703/10
See application file for complete search history.

(56) References Cited

U.S. PATENT DOCUMENTS

2007/0288214 A1* 12/2007 DeMartini et al. ............ 703/10

\* cited by examiner

*Primary Examiner*—Edward Raymond
(74) *Attorney, Agent, or Firm*—Koppel, Patrick, Heybl & Dawson

(57) ABSTRACT

A method for improving prediction of the viability of potential petroleum reservoirs, utilises a rock physics model appropriate for porous media, in which some of the solid material is "floating" or not involved in load support, and predicts permeability on the basis of compressional wave velocity vs. density trends, which may be determined by wireline log. In a further aspect, by introducing the concept of the capture fraction of smaller grains, another constraint is added to the model, which enables an improved estimate of permeability to be determined on the basis of seismic reflectivity measurements alone.

16 Claims, 12 Drawing Sheets

(a)

(b)

METHOD FOR IMPROVING PREDICTION
OF THE VIABILITY OF POTENTIAL
PETROLEUM RESERVOIRS

The present invention relates to the general area of the analysis and interpretation of subsurface regions from seismic and other measured data, and in particular to improving the prediction of the viability of potential petroleum reservoirs by determining improved estimates of reservoir permeability.

BACKGROUND OF THE INVENTION

Seismic reflection amplitudes have now been used for 35 years in prospecting for oil and gas reserves in certain types of sedimentary rocks. For rocks with high porosities and low bulk moduli the substitution of more compressible fluids such as oil or gas for less compressible fluids such as brine results in a significant reduction in both the density and particularly the compressional wave propagation velocity. Consequently, this also impacts the acoustic impedance of such reservoir rocks, thus affecting the reflection coefficient at interfaces between them and the impermeable sealing rocks with which they are in contact. This phenomenon was described in detail in the low frequency limit by Gassmann[1] and subsequently dynamically by Biot[2] several decades ago. At common seismic prospecting frequencies of 10-100 Hz, the low frequency limit of Gassmann is an appropriate description for typical sedimentary rocks. For a macroscopically isotropic and homogeneous porous medium with a connected solid framework or matrix and a connected pore space in which a single pore fluid pressure can be defined, the applicable equations may be written in the form:

$$\rho = \rho_g(1-\phi) + \rho_f \phi \quad (1)$$

$$\rho V_p^2 = K_g \left[ \frac{3(1-v_m)}{(1+v_m)} \beta + \frac{(1-\beta)^2}{\phi\left(\frac{K_g}{K_f} - 1\right) + 1 - \beta} \right] \quad (2)$$

and $$\rho V_s^2 = \mu_m = K_g \frac{3(1-2v_m)}{2(1+v_m)} \beta; \quad (3)$$

where $\rho_g$ and $K_g$ are the density and bulk modulus respectively of the solid or granular material of which the rock matrix is constructed, $\rho_f$ and $K_f$ are the corresponding properties of the pore fluid, $\phi$, is the porosity or fluid volume fraction of the rock, $K_m$, $\mu_m$ and $v_m$ are the bulk modulus, shear modulus and Poisson's ratio respectively of the evacuated porous rock matrix, $\beta=K_m/K_g$, and $V_p$ and $V_s$ are the compressional (P) and shear (S) wave propagation velocities in the fluid-saturated rock. If $\rho$, $V_p$ and $V_s$ are known along with the grain and fluid elastic properties for a particular pore fluid such as brine, these equations can be solved for values of the dimensionless quantities $\beta$ and $v_m$ which do not depend on the pore fluid and then $V_p$ and $V_s$ can be calculated for a new pore fluid such as oil or gas using these values.

The critical determinant of the magnitude of the fluid substitution effect on the P-wave velocity is the $V_p(\phi)$ or equivalently, $V_p(\rho)$, relation for the normal brine-saturated rocks at a given location. Such relations are commonly determined from wireline log measurements of both $\rho$ and the vertical $V_p$ made in previous wells. Of course, such relations can and do vary spatially even in the same geologic province in which neither the mineralogy nor deposition mechanism might be expected to vary significantly. It is therefore highly desirable to provide a model which can account for some of these differences, in order to be able to better account for these variations, and hence better predict the viability of potential petroleum reservoirs.

It has been known that sorting in the sedimentary rock is important in determining the permeability and hence the fluid flow which may be achieved from a well, but it has been difficult to predict permeability from measured seismic data. Empirical models have been used in the past, although these have been found not to correctly predict the density, shear velocity and compressional velocity over a range of compaction states and sorting. It is therefore particularly desirable to provide a model which can predict permeability with increased certainty on the basis of seismic data.

It has been known to model the effect of solid material in the pore space which is detached from the load-bearing matrix on the wave propagation velocities. Fabricius et al.[3,4] have proposed an effective medium model to estimate these velocities in porous media in which some of the solid material is in suspension. This model, called the MUHS isoframe model, combines a solid mineral endpoint with an endpoint consisting of a suspension at critical porosity using the Hashin-Shtrikman upper bound in a procedure first proposed by Dvorkin and Nur[5] for a rock with no suspended material and introduces a heuristic mixing parameter to characterize the fraction of solids in the system which are involved in load-support. The suspended solids exist in isolated pores throughout the medium so that the porous medium treated does not have one connected pore space as required to derive the Gassmann and Biot equations and thus this model is inconsistent with them. Such a model may be useful to estimate velocities in diagenetically altered carbonate rocks of low porosities with suspended solids in isolated vugular pores but is entirely inappropriate to describe the effects of fluid substitution and of suspended solids in porous and permeable hydrocarbon reservoir rocks such as those considered in relation to the present invention and will not correctly estimate these effects in them.

It is therefore desirable to provide an improved model of the effect of detached solid material in a connected pore space, which accurately models observed measurements.

SUMMARY OF THE INVENTION

A method for improving prediction of the viability of potential petroleum reservoirs by determining improved estimates of reservoir permeability, using a rock physics model for porous media in which some of the solid material is 'floating', or not involved in load support.

More specifically, the method comprises the steps of:
 (a) assembling measurements of P-wave velocity and density or porosity for a region of porous sedimentary rock to be modelled,
 (b) modelling the porous rock as a system consisting of a load-bearing solid matrix with pores containing fluids and also non-load-bearing solids, the proportion of solid material consisting of non-load bearing solids being represented by a floating solid fraction,
 (c) estimating a value for the floating solid fraction on the basis of the measurements of P-wave velocity and density or porosity, and the porous rock model,
 (d) determining an estimate of permeability as a function of porosity and estimated floating solid fraction, and (e) using the determined function to estimate reservoir permeability based on measured values of porosity and the estimated floating solid fraction.

Preferably, step (b) consists of modelling the porous rock as a closed system with a connected pore space occupied by pore fluid with a single pore pressure and including grains of non-load-bearing solid material in the pore space, the proportion of solid material consisting of non-load-bearing grains being represented by the floating solid fraction.

As will be shown in the following description, the method provides improved prediction of permeability, which will be shown to correspond with recent field observations with a reduced uncertainty.

The determination of an estimate of permeability as a function of porosity and estimated floating solid fraction may be based on measurements of permeability and porosity of core samples from the region, using a regression, or may alternatively be based on theoretical physical or mechanical relationships or on computer simulations of rock matrices.

By introducing an additional concept, the capture fraction of smaller grains, another constraint may be added to the model, which enables remote sensing of the viability of certain petroleum reservoirs by seismic reflectivity measurements alone. Therefore, in another aspect, one embodiment of the invention provides a method for improving prediction of the viability of potential petroleum reservoirs by determining improved estimates of reservoir permeability, comprising the steps of:

(a) assembling measurements of P-wave velocity and density or porosity for a region of porous sedimentary rock to be modelled, (b) modelling the porous rock as a system consisting of a load-bearing solid matrix with pores containing fluids and also non-load-bearing solids, the proportion of solid material consisting of non-load bearing solids being represented by a floating solid fraction, (c) estimating a value for the floating solid fraction on the basis of the measurements of P-wave velocity and density or porosity, and the porous rock model, (d) determining an estimate of permeability as a function of porosity and estimated floating solid fraction, (e) modelling the porosity as a function of the floating solid fraction, the effective compaction stress, defined as the difference between externally applied stress and the pore pressure, and a capture fraction representing the fraction of grains becoming part of the load supporting matrix during formation of the rock, (f) estimating the capture fraction, (g) estimating the effective stress, and (h) using the determined permeability function and the modelled porosity function to estimate reservoir permeability based on measured values of porosity obtained using seismic reflectivity.

This arrangement allows permeability to be estimated from seismic reflectivity, using the advantageous model developed in the following description. The method may also be implemented in a computer program.

BRIEF DESCRIPTION OF THE DRAWINGS

An embodiment of the invention will now be described, by way of example only, with reference to the drawings, in which.

DETAILED DESCRIPTION

Figure 1:
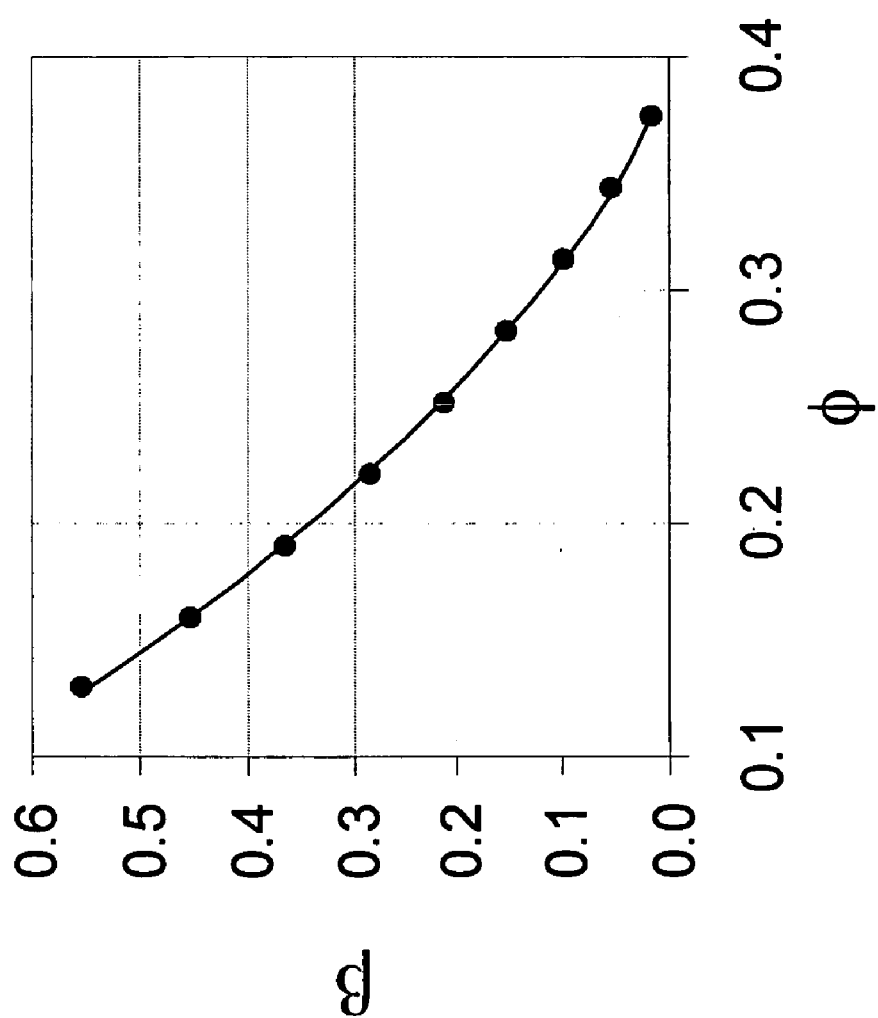
FIG. 1 is a plot of values of β derived from the typical sandstone ρ vs. $V_p$ trends for sandstones in the petroleum province under study (circles) in which it is assumed that all of the solid material comprising said sandstones is load-supporting, and a fit to them.

The present invention can be embodied in many different forms. The disclosure and description of the invention in the drawings and in this description are illustrative and explanatory thereof, and various changes in the sequence of processing steps, of the parameters in the processing and of the process details may be made without departing from the scope of the invention.

On the basis of equations (1) to (3) above, describing porous rock with a connected pore space, now consider a porous rock in which a second dispersed solid component is introduced with elastic properties $\rho_g^*$, $K_g^*$ and $\mu_g^*$ so that the porous rock remains macroscopically homogeneous and isotropic. Suppose some fraction, f, of this second solid component consists of load bearing grains which are substituted in the rock matrix for grains composed of the first solid material whereas the rest of this second solid component exists in the pores but is not attached to the solid matrix of the rock and thus does not contribute to the matrix moduli but is instead suspended in the pore fluid. One may then use Eq. (1) to Eq. (3) to describe the density and velocities in the porous rock but with modified constituent properties. Let f* be the volume fraction of the rock occupied by the second solid component. The volume fraction of this rock occupied by the first solid component is now $f_g = 1 - f^* - \phi$ and the volume fraction of the rock occupied by the suspended or floating fraction of the second solid material is $\phi_{flt} = (1-f)f^*$. The volume fraction of the rock which is not load bearing and, thus, not contributing to $K_m$ or $\mu_m$ is then $\hat{\phi}=\phi+\phi_{flt}$ the structural or matrix porosity, must replace $\phi$ in Eq. (2). The density of the composite rock is then $$\rho = f_g \rho_g + f^* \rho_g^* + \phi \rho_f = \rho_g + (\rho_g^* - \rho_g) f^* - (\rho_g - \rho_f) \phi \quad (4)$$

Note that $\rho$ is independent of f so if $\rho_g^* = \rho_g$, $\rho$ does not change.

The bulk modulus of the suspension in the rock pore space is now given by the Reuss[6] bound since both components are subjected to the same pressure and so in this two component case $K_f$ must be replaced by $\hat{K}_f$, where $$\hat{K}_f = \frac{\phi + \phi_{flt}}{\phi + \frac{K_f}{K^*}\phi_{flt}} K_f. \quad (5)$$

The bulk modulus of the composite solid material in the rock matrix, $\hat{K}_g$, which must replace $K_g$ in Eqs. (2) and (3), may be estimated by the arithmetic average of their Reuss and Voight[7] bounding bulk moduli as suggested by Hill[8].

It remains only to estimate the matrix moduli for this rock. At high differential pressures these matrix moduli will be functions only of the details of the microscopic geometry of the rock matrix. Since a representative value cannot be calculated even when a rock sample is available, one must use a reasonable functional form dependent on only macroscopic matrix geometry variables the principal one of which is $\hat{\phi}$. An empirical but useful approximation for $\beta = K_m/\hat{K}_g$, based on a critical scaling model, is $$\beta = \left(1 - \frac{\hat{\phi}}{\hat{\phi}_0}\right)^\lambda \quad (6)$$

where $\hat{\phi}_0$ is the critical porosity as introduced by Nur et al.[9] and $\lambda$ is the critical exponent. This form has the useful properties that $\beta=1$, as it must at $\hat{\phi}=0$, and $\beta=0$ at $\hat{\phi}=\hat{\phi}_0$, as it must at the suspension limit where there is no load bearing matrix. $\hat{\phi}_0$ and $\lambda$ may be estimated by fitting values of $\beta$ derived from measured wireline log data where $\phi_{flt}=0$. For averages of data from a large number of locations in the petroleum province under study, and used here to verify one embodiment of the present invention, with consistent $V_p(\rho)$ trends, we find $\hat{\phi}_0=0.4044$ and $\lambda=1.566$. We note that this value for $\hat{\phi}_0$, is in good agreement with measured values of the porosity of unconsolidated very well sorted sands[10]. FIG. 1 shows the values of $\beta$ derived from these velocity and density data (shown as circles) assuming a constant value of $v_m=0.15$, along with this empirical function derived from them using Eq. (6) with $\hat{\phi}_0=0.4044$ and $\lambda=1.566$. The standard deviation of the fit is 0.004.

Figure 11:
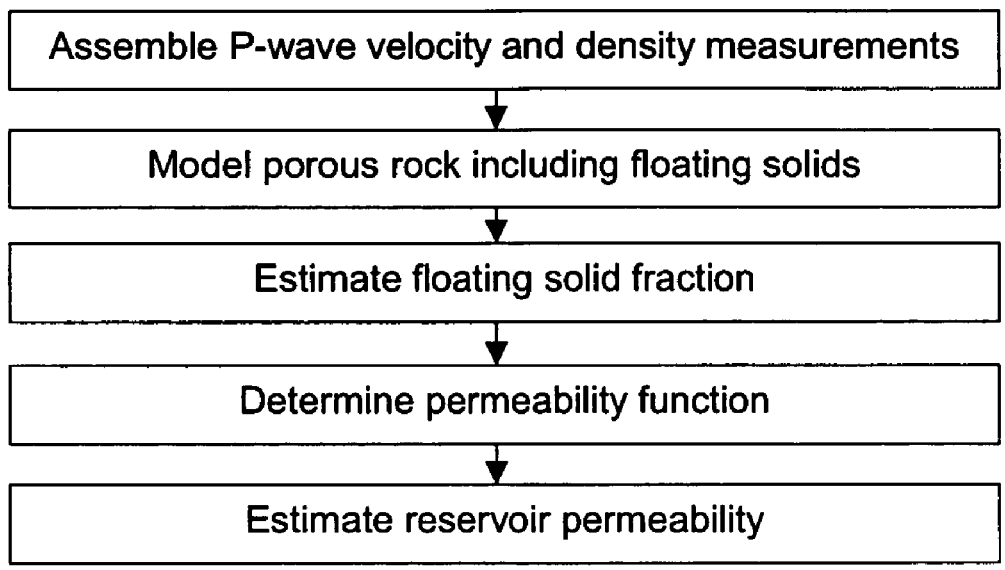
FIG. 11 is a flow chart illustrating the method of a preferred embodiment of the invention.

The main steps in the method according to one embodiment of the invention are set out in the flowchart of FIG. 11. First of all, measurements of P-wave velocity and density, or porosity, are assembled for a region of porous sedimentary rock to be modelled. These measurements may be taken as part of one embodiment of the invention, or may consist of previously measured data. The porous rock is then modelled as a closed system with a connected pore space occupied by pore fluid with a single pore pressure and including grains of non-load bearing solid material in the pore space, the proportion of solid material consisting of non-load bearing grains being represented by a floating solid fraction.

A value for the floating solid fraction is then estimated on the basis of the measurements of P-wave velocity and density, or porosity, and the porous rock model. This may be achieved by fitting the measurements to the porous rock model to find a value of the floating solid fraction which best fits the model, or alternatively the value may be estimated in other ways, such as by using a previously estimated value appropriate to the region, or by theoretical or computer modelling.

An estimate of permeability as a function of porosity and estimated floating solid fraction is then determined, which may again result from various methods such as computer simulation, theoretical relationships or different experimental data. One method is to assemble measurements of permeability and porosity of core samples from the region, and use these together with the estimated floating solid fractions in these core samples in a regression.

The determined function may then be used to estimate reservoir permeability based on measured values of porosity and the estimated floating solid fraction.

Figure 12:
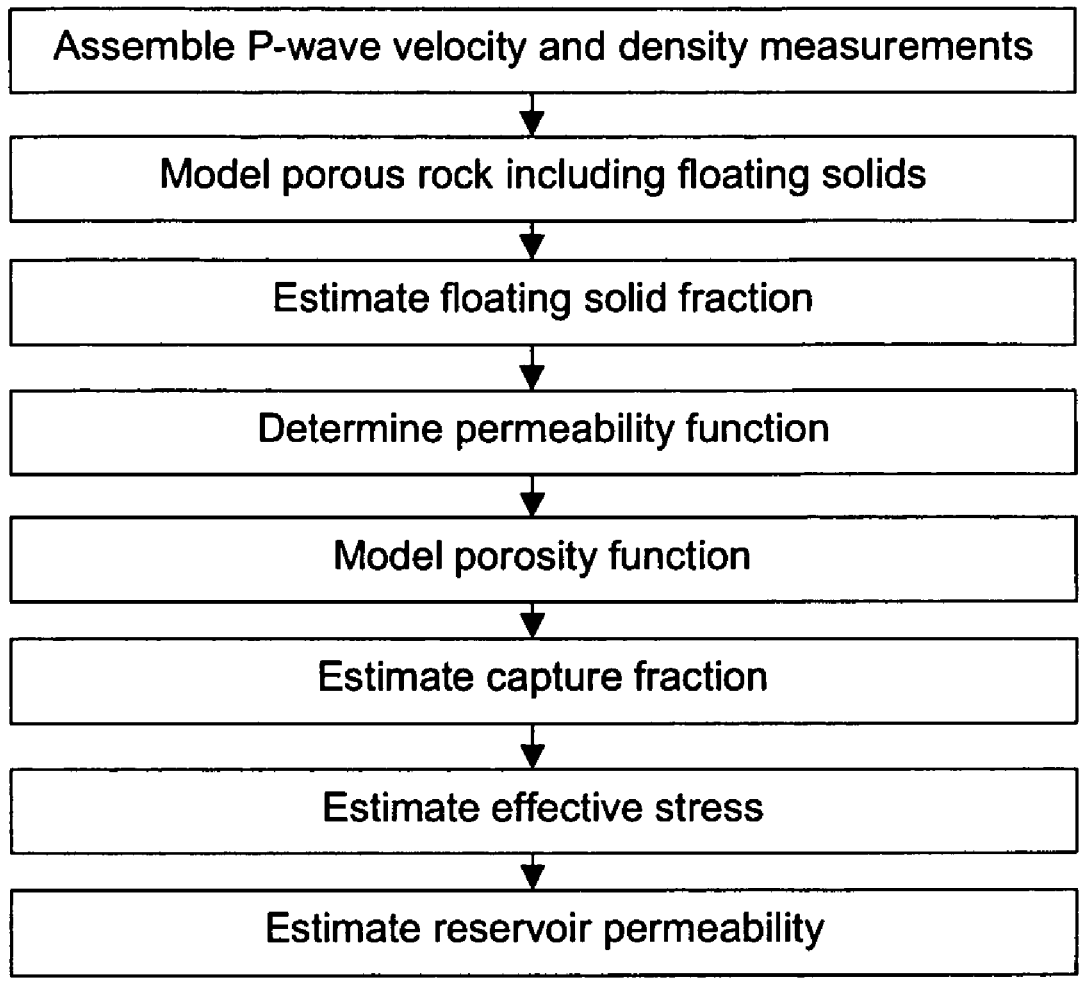
FIG. 12 is a flow chart illustrating the method of a further aspect of one embodiment of the invention.

FIG. 12 illustrates the main steps of a method according to a further aspect of one embodiment of the invention, in which the first four steps (i.e. assembling P-wave velocity and density, or porosity, measurements, modelling the floating solids in the porous rock, estimating the floating solid fraction and determining a permeability function) essentially correspond to those described in connection with FIG. 11. However the relationship between porosity and floating solid fraction is then modelled as a function of effective compaction stress, defined as the difference between externally applied stress and the pore pressure, and a capture fraction representing the fraction of grains becoming part of the load supporting matrix during formation of the rock. The capture fraction is then estimated, which may be done using a regression of measured data from the region, or by other suitable estimates or simulations, and the effective stress is then also estimated by any suitable technique. The addition of the modelled porosity function allows, in the final step, the reservoir permeability to be estimated on the basis of measured values of porosity obtained using seismic reflectivity, using the modelled porosity function together with the determined permeability function.

The method according to one embodiment of the invention, and the model which forms the basis of the embodiment, will now be demonstrated with reference to a measured data set.

Figure 2:
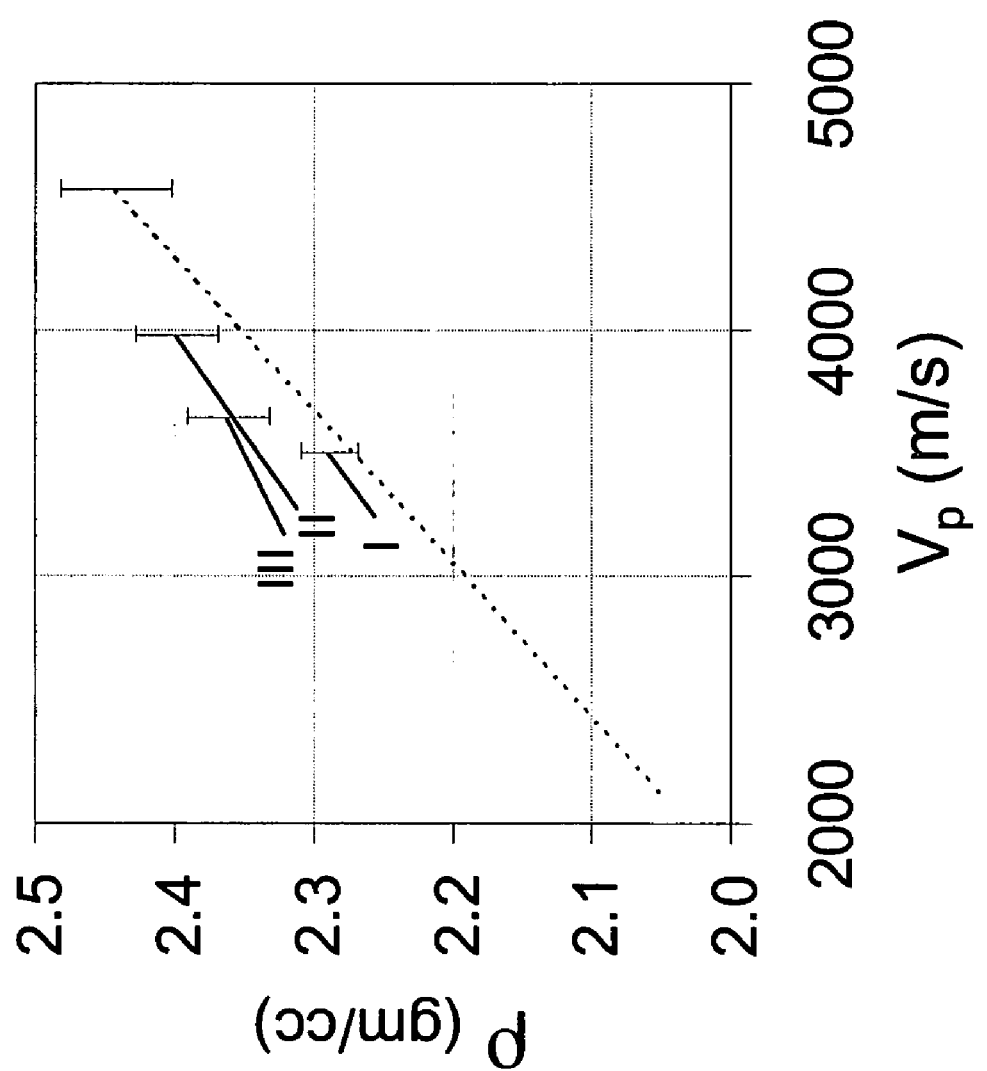
FIG. 2 is an average ρ vs. $V_p$ sandstone trend for the petroleum province under study and trends from three other locations in the province.
Figure 3:
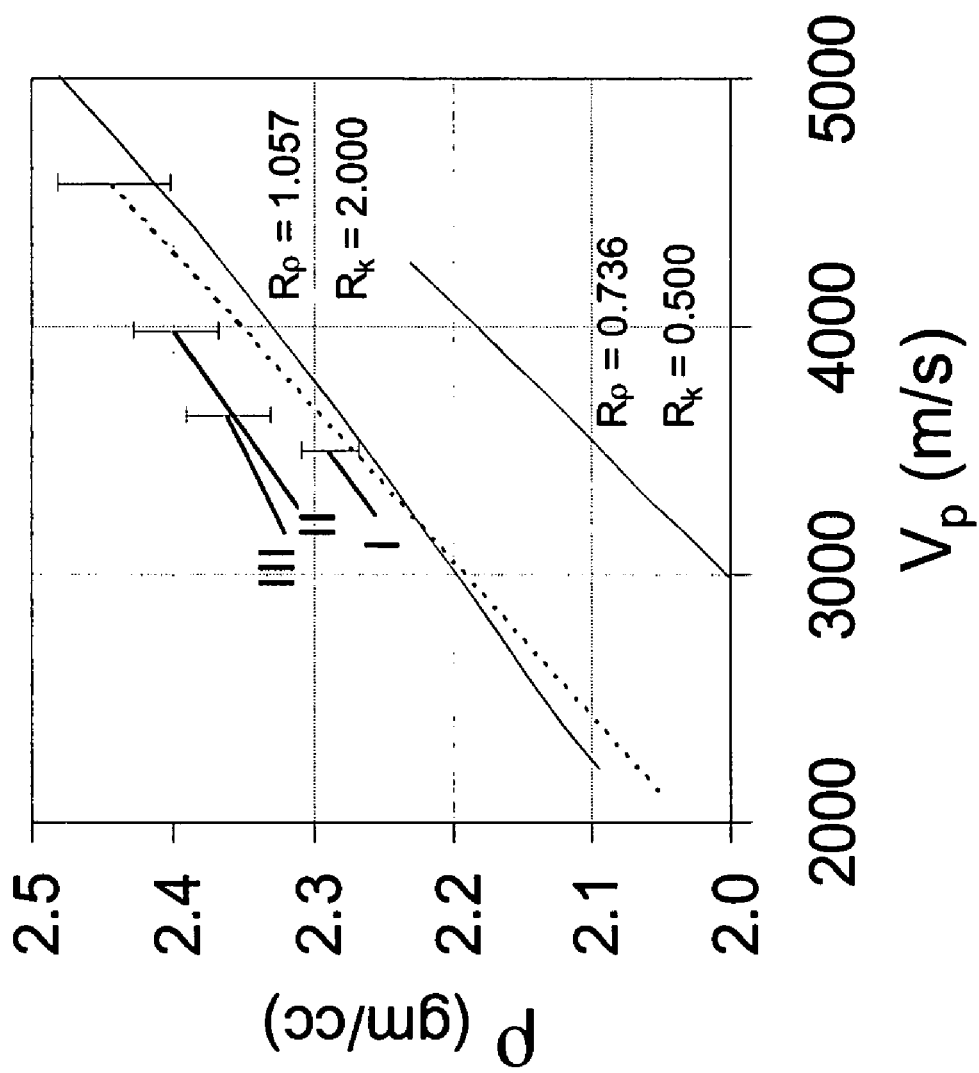
FIG. 3 shows a ρ vs. $V_p$ trend for typical sandstones in the petroleum province under study and for two anomalous locations with substantial amounts of lithic fragments, as well as comparison calculations using a conventional model.

Observations of brine-saturated sandstone density vs. P-wave velocity trends in sediments from three different locations in the same geologic petroleum province (located roughly on a line separated by 25 km and 65 km) show two with anomalously low velocities at a given density with respect to the others, as shown in FIG. 2. The dashed line shows the $\rho$ vs. $V_p$ trend, and the bold solid lines show trends from three locations in the province not widely separated, one of which is consistent with the average trend (I) and two of which are not (II and III). Error bars indicate two standard deviations of the fit to the $\rho$ vs. $V_p$ trends. The shales with which these anomalous sandstones are in contact, however, do not exhibit anomalous $\rho$ vs. $V_p$ trends. Notwithstanding their anomalous $\rho$ vs. $V_p$ relation, the relation of $V_s$ to $V_p$ in these anomalous sandstones as observed on wireline logs is not at all anomalous. Petrography of sandstone samples from these two locations shows a substantial fraction (~30%) of the rock solids to be lithic fragments, the exact mineralogy and hence, the elastic properties of which are unknown. However, calculation using the current model and the average trend from many other wells but assuming simple substitution of the lithic fragments for quartz grains in the rock matrix with no floating solid fraction (i.e., f=1.00 and f*=0.30) and with both substantially more compressive and lighter minerals (i.e. $R_K=K^*/K_g=0.5$ and $R_\rho=\rho^*/\rho_g=0.736$, characterizing an evaporite) and substantially less compressive and heavier minerals (i.e. $R_K=2.0$ and $R_\rho=1.057$, characterizing a carbonate) than quartz do not account for these anomalously slow rocks as shown in FIG. 3. FIG. 3 shows a $\rho$ vs. $V_p$ trend for typical sandstones in the petroleum province under study (dashed line) and for the two anomalous locations (bold solid lines) with substantial amounts of lithic fragments. Calculations using a conventional model with both lighter and more elastic lithic fragments and heavier and stiffer lithic fragments in the rock matrix are shown in solid lines and, as can be seen, do not account for the anomalous trends. Error bars indicate two standard deviations of the fit.

The densities and bulk moduli of a wide variety of rocks and minerals which occur in sedimentary rocks are correlated (see Appendix A) so these two cases characterize the results which can be expected from such mineral property variation alone. In the specific case under study, the lithic fragments were predominantly metamorphic rocks with some volcanics, carbonates and mudstones as well as a small amount of potassium feldspars.

Figure 4:
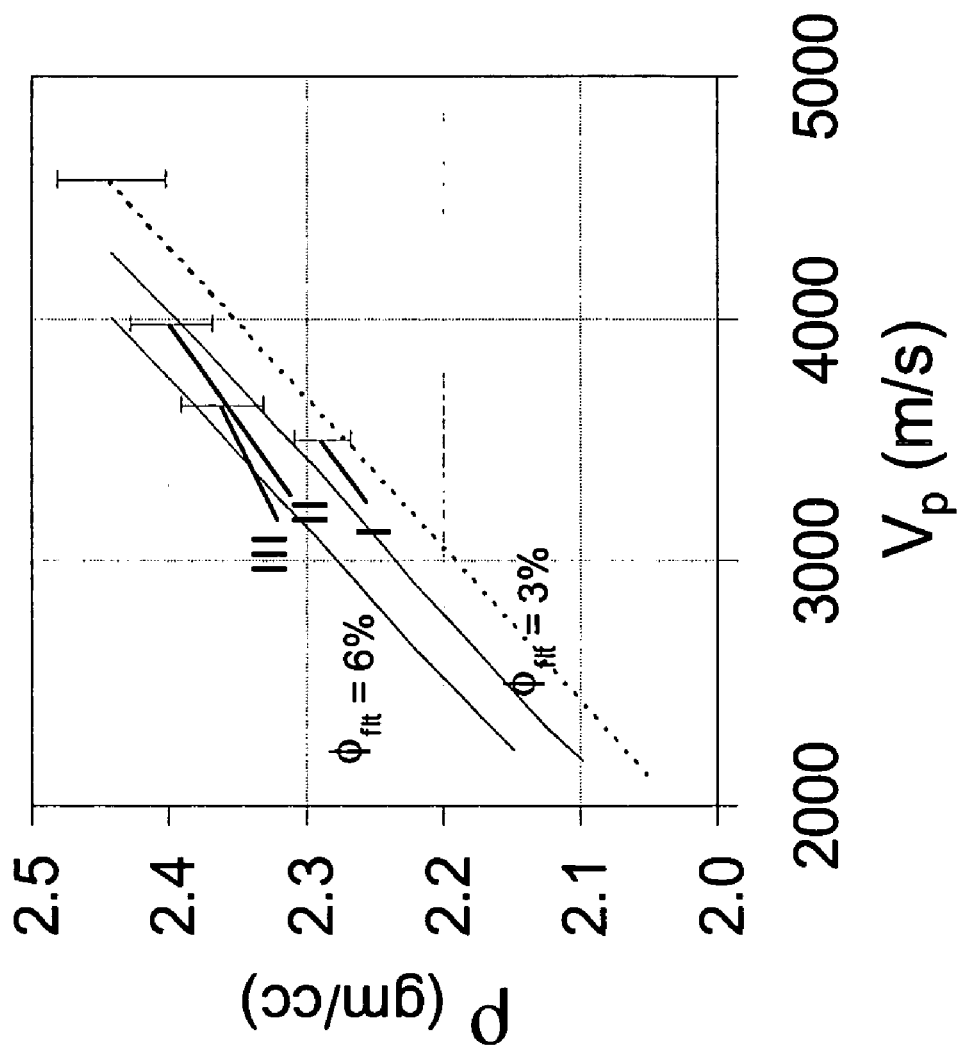
FIG. 4 shows sandstone ρ vs. $V_p$ trends calculated in accordance with one embodiment of the invention, together with observed trends.

Calculation of the effects of removing some of the solid material from the load supporting matrix of the rock and allowing it to float suspended in the fluid filled pores without changing its elastic properties (i.e. with $R_K=1.0=R_\rho$), however, shows that only a small fraction of the structural material, about 3% to 6% of the rock volume, need be detached and made non-load supporting to account for these anomalous trends. This results from the substantial reduction in the matrix modulus, $\beta$, as the rock or matrix porosity increases. FIG. 4 shows sandstone $\rho$ vs. $V_p$ trends calculated with $R_K=1.0=R_\rho$ from the typical sandstone trend in the petroleum province under study for varying amounts of floating solids (solid lines) computed with this model overlaid on the observed trends of FIG. 2. Error bars indicate two standard deviations of the fit.

This illustrates the way in which one embodiment of the invention models the observed changes in $\rho$ vs. $V_p$ trends on the basis of relatively small changes in the notional 'floating grain' percentage.

Though it is not in general possible to give an algebraic expression for $\partial V_p/\partial \phi_{flt}|_\phi$ which does not involve f or f*, in the case when the elastic properties of the second solid are the same as those of the first (i.e., for $R_\rho=1=R_K$) one finds $$\frac{\partial \rho}{\partial \phi_{flt}}\bigg|_\phi (\phi_{flt}=0, \phi) = 0 \qquad (7)$$

and $$\frac{\partial V_p}{\partial \phi_{flt}}\bigg|_\phi (\phi_{flt}=0, \phi) = -\frac{\lambda}{2\hat{\phi}_0}\left(1-\frac{\phi}{\hat{\phi}_0}\right)^{\lambda-1}\left[\frac{3(1-v_m)}{(1+v_m)} - F(2-F)\right]\frac{K_g}{\rho(\phi)V_p(\phi)}, \qquad (8)$$

where $$F = \frac{1-\beta(\phi)}{G\phi + 1 - \beta(\phi)}, \qquad (9)$$

$$G = \frac{K_g}{K_f} - 1 \qquad (10)$$

and $v_m$ is assumed to be independent of $\hat{\phi}$. In the case of a sandstone matrix composed of quartz with $v_m=0.15$ and the normal $\rho$ vs. $V_p$ trend shown for sandstones in the petroleum province shown above, $\partial V_p/\partial \phi_{flt}$, varies between –8700 m/s and –10000 m/s in the $\phi$ range of 0.15 to 0.35. This linear approximation thus results in a shift of the trend to the left in FIG. 4 with increasing $\phi_{flt}$ as observed.

The linearization in $\phi$ under the same conditions leading to Eqs. (7) and (8) produces $$\frac{\partial \rho}{\partial \phi_{flt}}\bigg|_\phi (\phi_{flt}=0, \phi) = -(\rho_g - \rho_f) \qquad (11)$$

and $$\frac{\partial V_p}{\partial \phi}\bigg|_{\phi_{flt}} (\phi_{flt}=0, \phi) = (1+g)\frac{\partial V_p}{\partial \phi_{flt}}\bigg|_\phi (\phi_{flt}=0, \phi) \qquad (12)$$

where $$g = \frac{\hat{\phi}_0}{\lambda\left(1-\frac{\phi}{\hat{\phi}_0}\right)^{\lambda-1}}\left[\frac{GF^2 - \frac{(\rho_g-\rho_f)V_p^2}{K_g}}{\frac{3(1-v_m)}{(1+v_m)} - F(2-F)}\right] \qquad (13)$$

Again, for a normal sandstone as described above and with $v_m=0.15$, g increases monotonically from –0.025 at $\phi=0.15$ to 0.105 at $\phi=0.35$.

Figure 5:
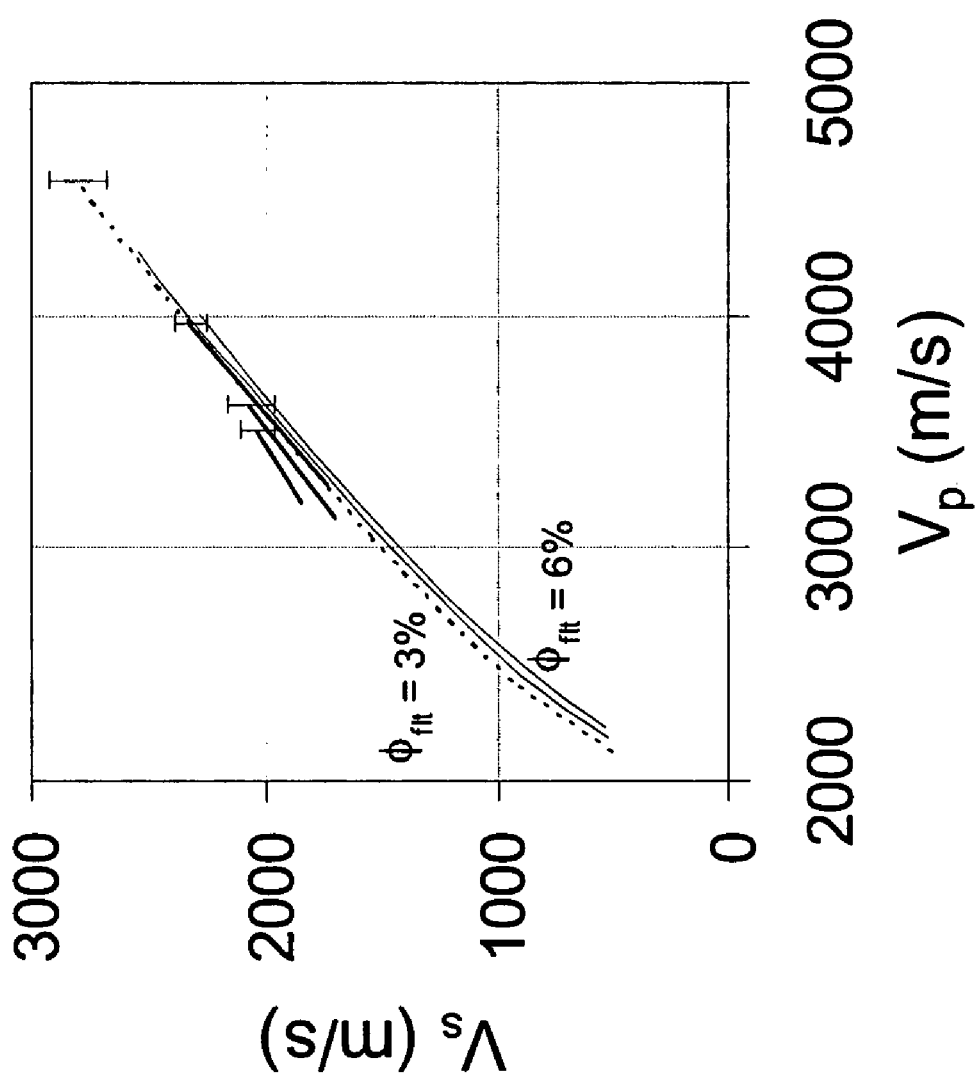
FIG. 5 shows sandstone $V_s$ vs. $V_p$ trends calculated in accordance with one embodiment of the invention, together with observed trends.

Of course, any such model must also account for the absence of a significant difference in the $V_s$ to $V_p$ relation. It is easy to show (see Appendix B) that Eq. (1) to Eq. (3) along with Eq. (6) lead to the result that $$V_p(\phi_{flt}, \phi) \cong V_p(0, \hat{\phi}) \qquad (14)$$

and $$V_s(\phi_{flt}, \phi) \cong V_s(0, \hat{\phi}) \qquad (15)$$

at least for the case where $R_\rho=1=R_K$ and $v_m$ is independent of $\hat{\phi}$, which is surely a good approximation for $\phi_{flt}<<\phi$. The approximation is valid for $K_g>>K_f$, which is true for all sedimentary rocks and fluids. This means that in the current model, a change in $\phi_{flt}$ and thus in $\hat{\phi}$ without changing the fluid porosity $\phi$ does not significantly change the $V_s$ to $V_p$ relation. Instead, a point on the curve describing this relation at $\phi_{flt}=0$ merely moves to another point on this same curve at a lower value of $V_p$ when $\phi_{flt}>0$, so this model yields a result consistent with the observation that the $V_s$ to $V_p$ relation does not change. FIG. 5 shows sandstone $V_s$ vs. $V_p$ trends calculated with $R_K=1=R_\rho$ from the typical sandstone trend (dashed line, petroleum province under study) for varying amounts of floating solids (solid lines) computed with this model overlaid on the observed trends seen at the wells. Error bars indicate two standard deviations of the fit. No significant differences are seen in any of these trends.

This model requires floating grains in the pore spaces of the load supporting rock matrix at the anomalous locations which are not present in the rocks at the nearby locations where normal $\rho$ vs. $V_p$ relations are observed. Such floating solids are not easy to envision for a well sorted sandstone where all the grains have similar dimensions since the pore spaces in structures composed of such grains have similar sizes to the grains themselves so that no grain can readily fit in these pores without contacting several other grains and thus contributing to load support. On the other hand, for poorly sorted sandstones smaller grains of solid material would be available at the time of deposition when the rock matrix was constructed which could easily be trapped in the larger pores formed by contacts between multiple large grains and at least some of these may not have been fixed into the load supporting matrix by subsequent compaction. Consequently, one might expect a difference in the grain size distribution and sorting of the sandstones obtained from the anomalous and nearby normal locations.

Figure 6:
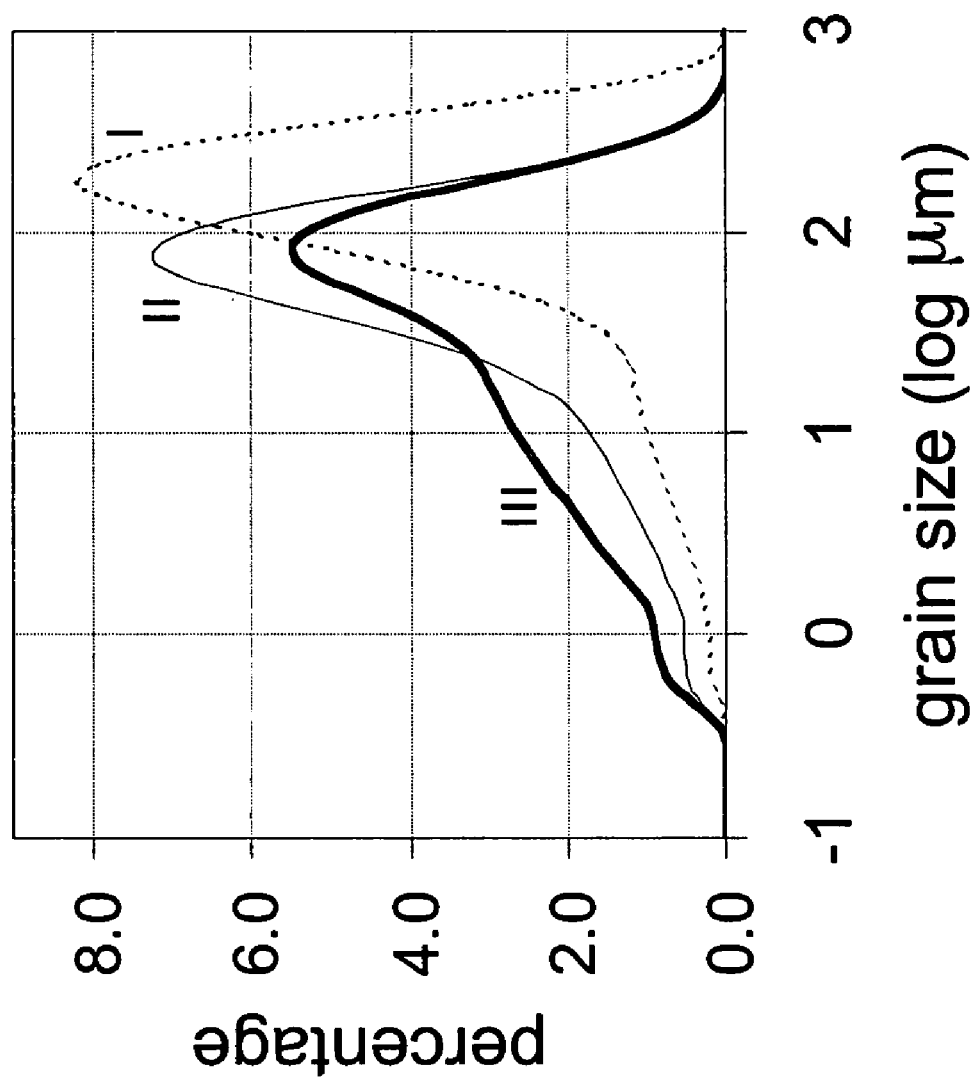
FIG. 6 shows plots of grain size distributions for three wells measured in the province under study.
Figure 7:
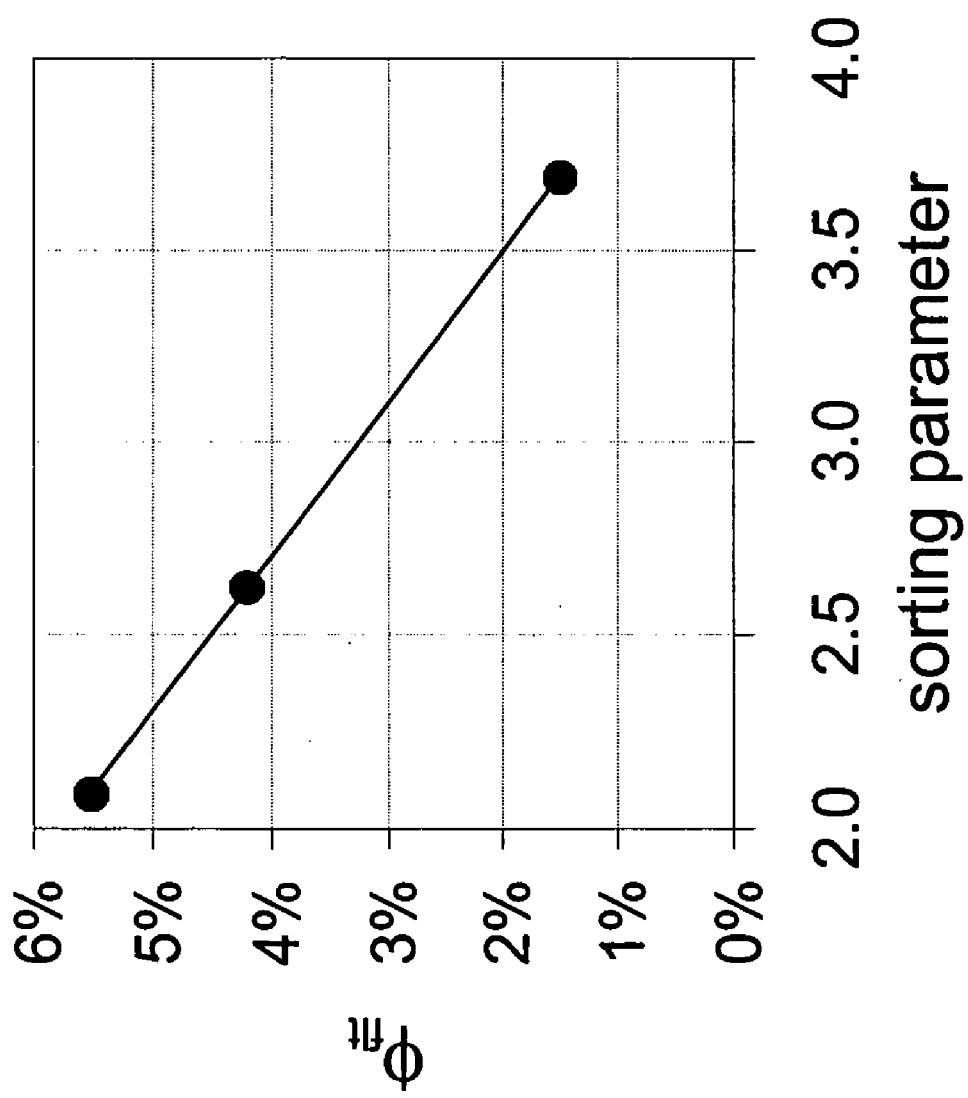
FIG. 7 shows the floating solid fraction of rock volume derived in accordance with one embodiment of the invention from the observed ρ vs. $V_p$ trends plotted against a sorting parameter.

Cores were available from both of the two anomalous locations as well as from a nearby location with a normal $\rho$ vs. $V_p$ trend, and these were used to verify the model. Grain size distributions were determined on sandstone samples from these cores by laser grain size analysis[11], a standard petrophysical technique. FIG. 6 shows the measured grain size distributions for three wells, which show a bimodal shape. Well I is plotted as the dashed line, well II as the solid line, and well III as the bold solid line. We use as a measure of sorting the mean of the observed distribution of logarithmic grain diameters divided by its standard deviation. FIG. 7 shows the mean $\phi_{flt}$ at each of these locations which best accounts for the $\rho$ vs. $V_p$ trend plotted observed in each case, against this sorting parameter. The solid line is a linear fit to the points.

Having demonstrated the floating grain model on which one embodiment of the invention is based, the influence of sorting variations on fluid flow will now be considered.

Figure 8:
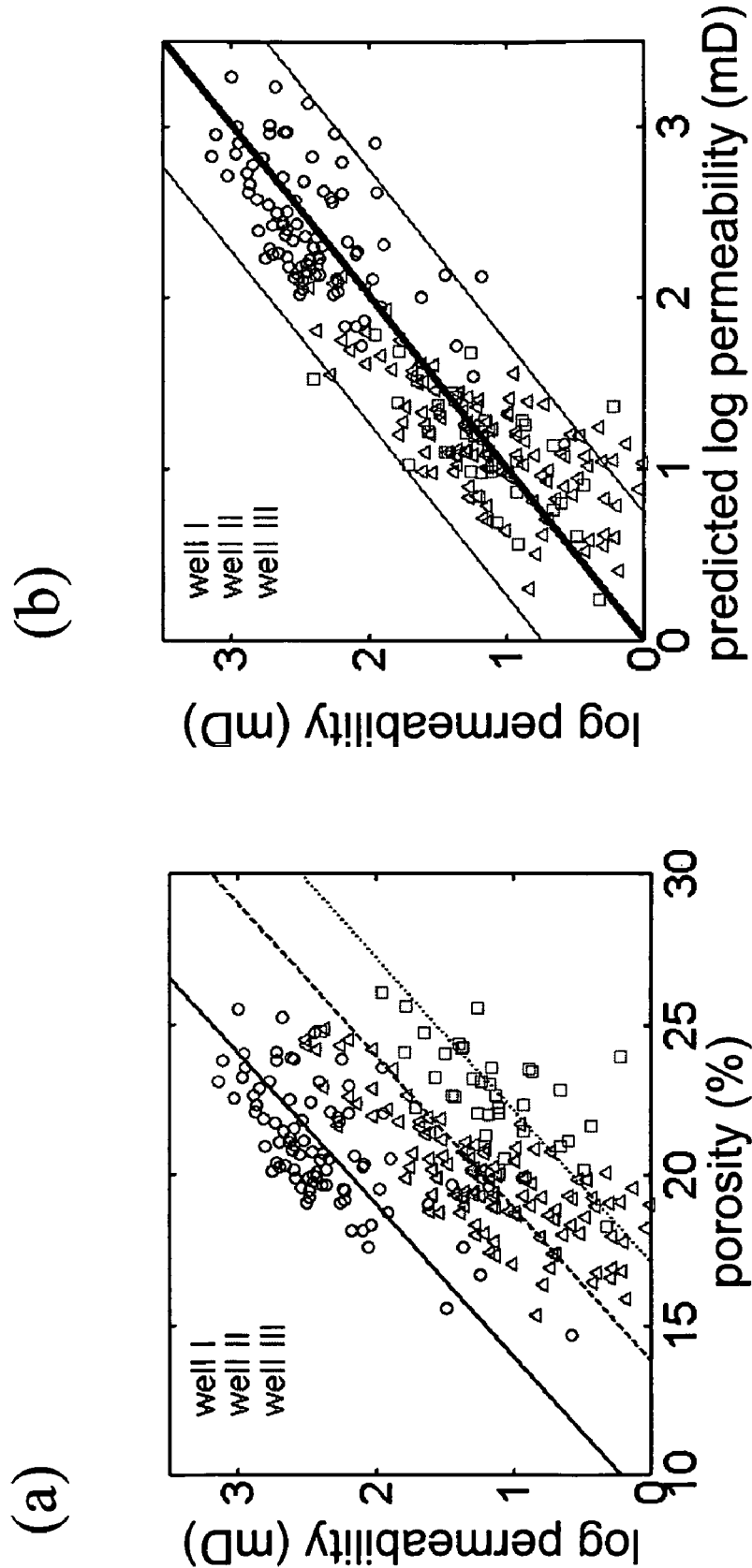
FIG. 8(a) shows a plot of the log of the permeability measured on three cores from the province plotted vs. the porosity of the core
FIG. 8(b) shows the log of the permeability measured on each core plotted vs. the permeability estimated using one embodiment of the invention.

Sorting variations often correspond to variations in the relation between permeability and fluid porosity, $\phi$, a crucial relation in determining the economic value of a hydrocarbon reservoir. Poorer sorting corresponds with lower permeability at a given $\phi$. Logarithms of the measured permeabilities from several sandstone plugs obtained from cores at all three of the locations discussed above are plotted against their measured fluid porosities in FIG. 8a. The circles show measurements at well I, triangles at well II, and squares at well III. Linear fit curves to those points are shown as a solid line (well I), dashed line (well II) and dotted line (well III) respectively. Note the systematically higher permeabilities at the location with the normal $\rho$ vs. $V_p$ trend (well I) at a given porosity than at those locations with anomalous $\rho$ vs. $V_p$ trends. Using the mean $\phi_{flt}$ values determined above by fitting the $\rho$ vs. $V_p$ trends at each location in a regression of logarithmic permeability vs. porosity results in the plot shown in FIG. 8b. The uncertainty in the estimated logarithmic permeabilities is reduced by more than a factor of two with this regression:

$$\log(k) = 0.198\phi - 0.325\phi_{flt} - 1.76 \qquad (16)$$

where the permeability, k, is given in mD and both $\phi$ and $\phi_{flt}$ are expressed as percentages of rock volume. FIG. 8(b) shows the permeability estimated by Eq.(16), with two standard deviation uncertainty in the regression shown as the thin solid lines. This suggests that permeability estimates and thus the economic viability of a potential reservoir may be substantially improved by observation of the $\rho$ vs. $V_p$ trends which can be obtained from wireline logs without the need for permeability measurements on more than a few core samples. Note here that for the normal $\rho$ vs. $V_p$ trend with $\phi_{flt}=0$, this regression corresponds to a permeability of 1 mD at $\phi=8.9\%$ while for $\phi_{flt}=5\%$, the same permeability requires $\phi=17.1\%$ or $\hat\phi=22.1\%$, a very substantial difference.

In a preferred embodiment of the invention, an equation of the form set out as Eq.(16) is used as an estimate of the permeability function, and measured data may be fitted to the equation in order to estimate the function, as described above. However, the constants determined in this way may be directly applied to nearby fields, in regions with the same geology, so that such a regression or fitting need not be carried out whenever this embodiment of the invention is used. Furthermore, constants based on those given in Eq. (16) may also be generally applicable, or a function determined by computer simulation of theoretical means may also be used.

In a further preferred aspect of the invention, an additional concept is introduced, relating to the efficiency of capture of the smaller grains into the matrix. In accordance with this further aspect, this additional factor is utilized as detailed below.

Figure 9:
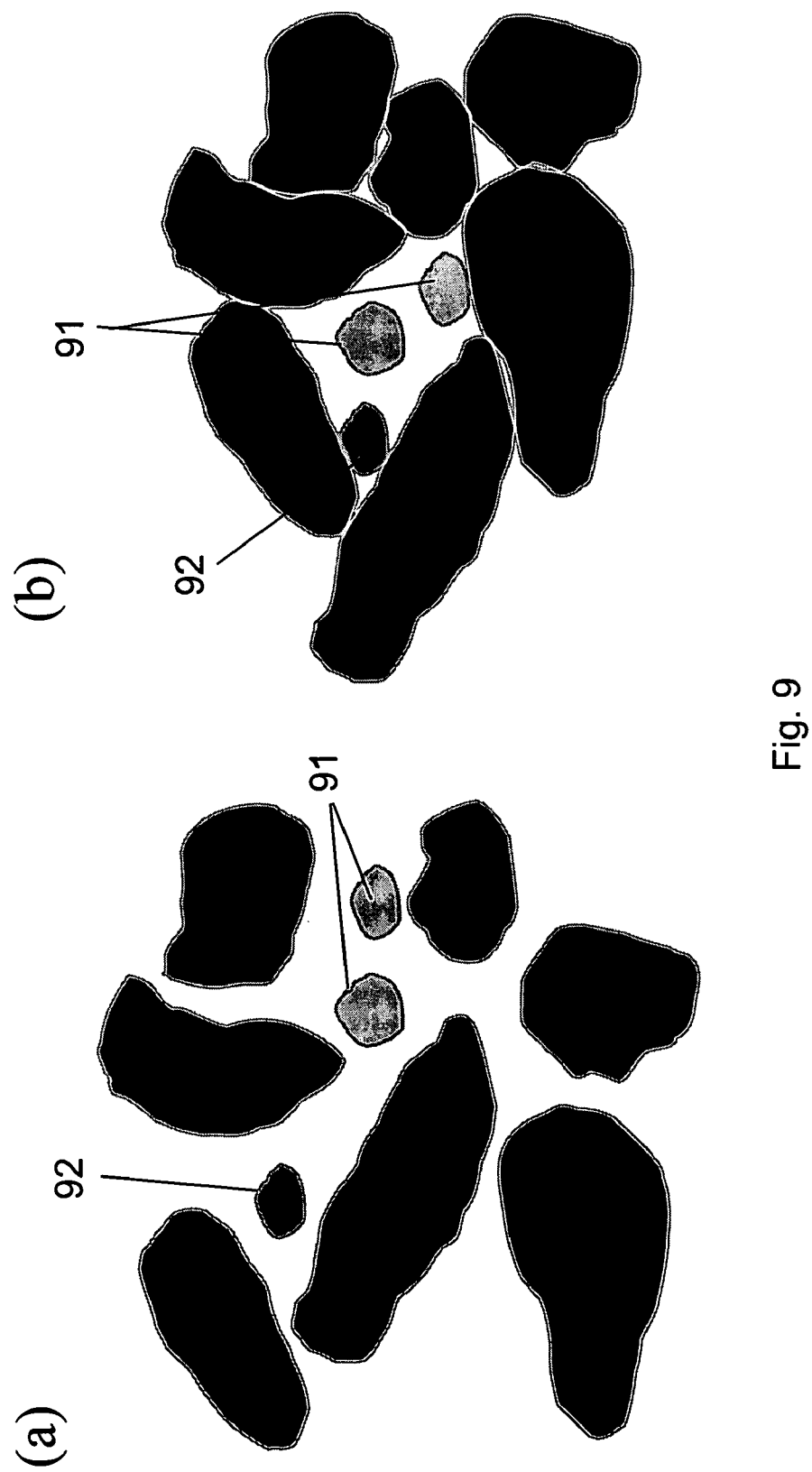
FIG. 9(a) illustrates bimodal grain distribution before the rock is assembled and compacted.
FIG. 9(b) shows the same grain distribution after it is assembled and compacted.

As a rock is formed with different grain sizes and then compacted with an effective stress, $P_e$ (i.e. the difference between the externally applied stress and the pore pressure), it may be assumed that a fraction of the smaller grains become part of the matrix, $f_c$, and others remain uninvolved in load support FIG. 9 shows: (a) a picture of grains in a bimodal grain distribution before it is assembled and compacted, and (b) the same grain distribution after it is assembled and compacted. The two small light grey grains 91 are "floating", and do not contribute to load support. The small dark grey grain 92 is captured.

On the basis that this capture fraction is reasonably insensitive to the compaction, the porosity may then be modeled as a function of the floating solid fraction, the effective compaction stress and the capture fraction, and is preferably modeled by an equation of the form $$\phi = -\frac{\phi_{flt}}{1-f_c} - A(1 - e^{-P_e/P_o}) + B, \qquad (17)$$

where A, B and $P_0$ are positive constants. When data from the three wells is regressed to determine the capture fraction, it is found to have a most likely value of $\frac{1}{3}$, as shown in FIG. 9(b), with a plus to minus two standard deviation range from $\frac{1}{5}$ to $\frac{1}{2}$. The most likely values for the constants are found to be A=0.88, B=1.10, and $P_0$=50 bar. The uncertainties in these constants are highly correlated to the uncertainty in the capture ratio. This relationship is critical in relating seismic reflectivity to permeability. One does not know, from reflectivity alone, the velocity vs. density trend and, therefore, $\phi_{flt}$. But given knowledge of the effective stress, $P_e$, and Eq. (17), the dependence of Eq. (16) on $\phi_{flt}$ can be eliminated, and permeability can then be estimated from seismic reflectivity.

In accordance with this further aspect of one embodiment of the invention, therefore, the relationship between porosity and floating solid fraction is modelled as a function of the effective compaction stress and the capture fraction, and using estimates of the capture fraction and the effective stress, the determined permeability function and the modelled porosity function are used to estimate reservoir permeability based on measurements of porosity obtained using seismic reflectivity.

In either aspect of the embodiment, the resulting estimates of reservoir permeability may be determined with reduced uncertainty, and used in the prediction of the viability of potential petroleum reservoirs, for example in drilling decisions and decisions regarding further exploration of a region.

The embodiment of the invention therefore provides a method for improving prediction of the viability of potential petroleum reservoirs, which uses a rock physics model appropriate for porous media in which some of the solid material is "floating" or not involved in load support, that accounts for observed variation in compressional wave velocity vs. density trends. This same model predicts no significant change in the shear vs. compressional wave velocity trend, as is also observed. These floating grains are correlated with a lack of sorting of the matrix grains as expected. The presence of the floating grains is found to correlate with a decrease in the permeability of the rock and therefore the viability of potential petroleum reservoirs. Shifts in the velocity vs. density relationships can be determined by wireline log but not directly by seismic reflectivity measurements. However, by introducing an additional concept, the capture fraction of smaller grains, a further aspect of this embodiment of the invention adds another constraint to the model which enables remote sensing of the viability of certain petroleum reservoirs by seismic reflectivity measurements alone.

The described method may be implemented in the form of a computer program, which may be recorded on a suitable medium.

The above describes a particular preferred embodiment of the invention. However, modifications may be made within the scope of the claims. In particular, the different steps of the method set out in claims 1 and 11 may be implemented in the particular ways set out in the description above, or in equivalent ways, and it should particularly be noted that the specifically described method of any given step may be carried out in combination with implementations of other steps with are different to the specific examples given. Furthermore, several of the method steps set out in the claims may be merged and carried out at the same time.

Although the invention has been described with reference to a specific embodiment, it will be appreciated that it is not limited to the described embodiment, and is limited only by the scope of the claims.

REFERENCES

[1] F. Gassmann, Vierteljahrsschrift der Naturforschenden Gasellschaft in Zurich 96, 1 (1951).

[2] M. Biot, J. Acoust. Soc. Amer. 28, 168 (1956); M. Biot, J. Acoust. Soc. Amer. 28, 179 (1956).

[3] I. L. Fabricius, AAPG Bulletin 87, 1755 (2003).

[4] I. L. Fabricius, et al., AAPG International Conference, Cancun, Mexico, (2004).

[5] J. Dvorkin and A. Nur, Geophysics 61, 1363 (1996).

[6] A. Reuss and Z. Angew, Math. Mech. 9, 49 (1929).

[7] W. Voight, *Lehrbuch der Kristallphysik* (Teubner, Leipzig, 1928).

[8] R. Hill, Proc. Phys. Soc. London Ser. A 65, 349 (1952).

[9] A. Nur, et al., The Leading Edge 17, 357 (1998).

[10] D. C. Beard and P. Weyl, AAPG Bulletin 57, 2 (1973).

[11] J. C. Dur, F. Elsass, V. Chaplain, D. Tessier, European Journal of Soil Science 55, 265 (2004).

[12] A. Sakellariou et al., Extended Abstracts of 73rd Annual Meeting of Society of Exploration Geophysicists, Dallas, paper RP2.6. SEG, Tulsa (2003).

[13] O. L. Anderson, in *Determination and some uses of isotropic elastic constants of polycrystalline aggregates using single-crystal data, physical acoustics*, edited by Warren P. Moss (Academic Press, New York, 1965), Vol. III-B, pp. 43-95.

[14] G. Simmons and H. Wang, *Single crystal elastic constants and calculated aggregate properties: a handbook* (MIT Press, Cambridge, 1971).

[15] A. Nur, PhD thesis, MIT (1969).

[16] E. Screiber, P. J. Fox, and J. J. Peterson, in *Initial reports of the deep sea drilling project*, edited by W. B. E. Ryan (US Government Printing Office, Washington D.C., 1972), Vol. 13, p. 395.

[17] F. Birch, in Handbook of physical constants, edited by S. P. Clark, Jr. (Geological Society of America, New York, 1966), Vol. 97, Chap. 7, p. 97.

[18] F. Birch, Journal of Geophysical Research 65, 1083 (1960).

[19] G. Simmons, Journal of Geophysical Research 69, 1123 (1964).

[20] D. S. Hughes and J. H. Cross, Geophysics 16, 577 (1951).

[21] A. F. Woeber, S. Katz, and T. J. Ahrens, Geophysics 28, 658 (1963).

Appendices

Appendix A: Density Vs. Bulk Modulus Correlation

Figure 10:
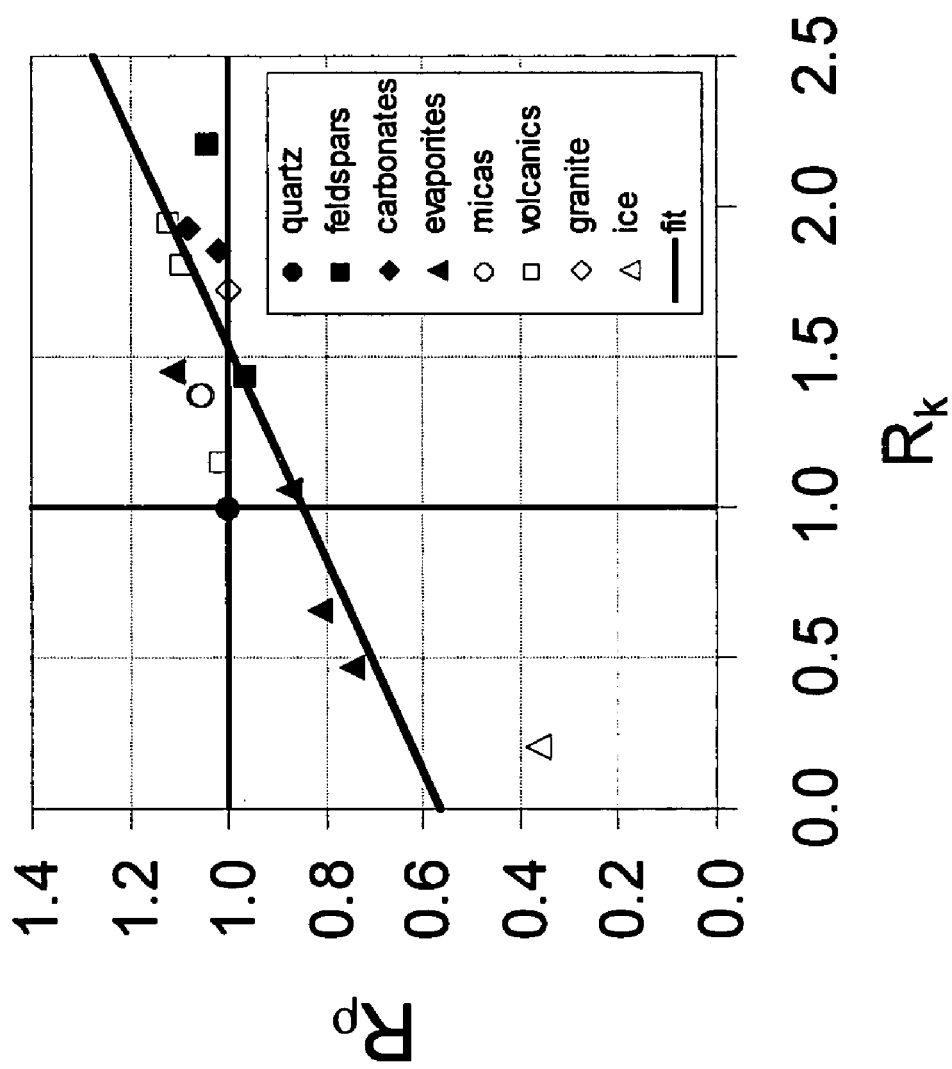
FIG. 10 shows a plot of rock and mineral densities vs. their bulk moduli both scaled by the values of alpha quartz.

The densities and bulk moduli of many components of sedimentary rocks as listed in Table I are well correlated as illustrated in FIG. 10 where the ratio of the density of each component to that of quartz is plotted against the ratio of its bulk modulus to that of quartz. The data listed for specific minerals such as quartz, anhydrite, calcite, the micas muscovite and phlogopite, microcline, halite, sylvite and ice are taken from compilations of values computed from measurements of the single crystal elastic constants for an isotropic polycrystalline aggregate of crystals by Anderson[13] and Simmons and Wang.[14] The values for dolomite, anorthite, the volcanics diorite and basalt and for granite are taken from measurements of specific samples of rocks or, where possible, averages of selected measurements.[15,16,17,18,19,20,21]

A straight line fit to these data not including quartz gives $R_\rho = 0.565 + 0.285 R_k$ with a standard deviation of 0.112. Including quartz, the fit is $R_\rho = 0.589 + 0.274 R_k$ with a standard deviation of 0.114.

TABLE I

Rock or mineral $R_\rho$ and $R_k$ values

| Rock or mineral | Density (gm/cc) | K ($10^{10}$ dynes/cm2) | Rρ | Rk | Reference |
|---|---|---|---|---|---|
| Quartz | 2.654 | 37.9 | 1.000 | 1.000 | 14 |
| Anorthite | 2.76 | 83.9 | 1.040 | 2.214 | 19, 20 |
| Microcline | 2.56 | 54.65 | 0.965 | 1.442 | 14 |
| Dolomite | 2.867 | 73.0 | 1.080 | 1.926 | 19 |
| Calcite | 2.708 | 70.15 | 1.020 | 1.851 | 13 |
| Anhydrite | 2.962 | 54.95 | 1.116 | 1.450 | 14 |
| Gypsum | 2.32 | 40.0 | 0.874 | 1.055 | 16, 17 |
| Halite | 2.162 | 24.85 | 0.815 | 0.656 | 13 |
| Sylvite | 1.988 | 17.80 | 0.749 | 0.470 | 13 |
| Muscovite | 2.79 | 52.2 | 1.051 | 1.377 | 14 |
| Phlogopite | 2.81 | 52.25 | 1.059 | 1.379 | 14 |
| Basalt (low) | 2.69 | 57.1 | 1.014 | 1.153 | 21 |
| Basalt (high) | 2.97 | 73.9 | 1.119 | 1.950 | 21 |
| Diorite | 2.92 | 68.8 | 1.096 | 1.815 | 18, 19 |
| Granite | 2.66 | 65.3 | 1.002 | 1.723 | 15 |
| Ice | 0.96 | 7.9 | 0.362 | 0.208 | 13 |

Appendix B: Shear Vs. Compressional Velocity Trends

One has for $V_p$ from Gassmann $$V_p^2 = \frac{\hat{K}_g}{\hat{\rho}}\left[\frac{3(1-v_m)}{(1+v_m)}\beta + \frac{(1-\beta)^2}{\phi\left(\frac{\hat{K}_g}{\hat{K}_f}-1\right)+1-\beta}\right], \quad (B1)$$

where $$\beta = \left(1 - \frac{\hat{\phi}}{\hat{\phi}_0}\right)^\lambda, \quad (B2)$$

and $\hat{\phi}_0$ is some constant. For $\rho^*=\rho_g$ and $K^*=K_g$ (i.e. for $R_\rho=1=R_K$) this gives $$V_p^2(\phi_{flt}, \phi) = \frac{K_g}{\rho}\left[\frac{3(1-v_m)}{(1+v_m)}\left(1-\frac{\hat{\phi}}{\hat{\phi}_0}\right)^\lambda + \frac{\left[1-\left(\frac{\hat{\phi}}{\hat{\phi}_0}\right)^\lambda\right]^2}{\hat{\phi}\left(\frac{K_g}{\hat{K}_f}-1\right)+1-\left(1-\frac{\hat{\phi}}{\hat{\phi}_0}\right)^\lambda}\right], \quad (B3)$$

and for $\phi_{flt} = 0$, $$V_p^2(0, \phi) = \frac{K_g}{\rho}\left[\frac{3(1-v_m)}{(1+v_m)}\left(1-\frac{\phi}{\hat{\phi}_0}\right)^\lambda + \frac{\left[1-\left(\frac{\phi}{\hat{\phi}_0}\right)^\lambda\right]^2}{\phi\left(\frac{K_g}{K_f}-1\right)+1-\left(1-\frac{\phi}{\hat{\phi}_0}\right)^\lambda}\right], \quad (B4)$$

where $$\hat{K}_f = \frac{(\phi+\phi_{flt})}{\left(\phi+\frac{K_f}{K^*}\phi_{flt}\right)}K_f = \frac{K_f}{1-\left(1-\frac{K_f}{K^*}\right)\frac{\phi_{flt}}{(\phi+\phi_{flt})}}. \quad (B5)$$

Now, for sedimentary rocks, $K_f \ll K^*$ since $K_f$ is the bulk modulus of a fluid such as brine while $K^*$ is the bulk modulus of a solid mineral such as silicon dioxide for a quartzitic sandstone, so we have $$\hat{K}_f \cong \frac{K_f}{1-\frac{\phi_{flt}}{(\phi+\phi_{flt})}}, \quad (B6)$$

and since at least for small $\phi_{flt}$, $\phi_{flt} \ll \phi+\phi_{flt}$, one has $$K_f \cong \hat{K}_f, \quad (B7)$$

and thus, $$V_p(\phi_{flt},\phi) \cong V_p(0,\phi+\phi_{flt}). \quad (B8)$$

Now, one also has from Gassmann, $$V_s^2(\phi_{flt}, \phi) = \frac{K_g}{\rho}\frac{3(1-2v_m)}{2(1+v_m)}\beta = \frac{K_g}{\rho}\frac{3(1-2v_m)}{2(1+v_m)}\left(1-\frac{\hat{\phi}}{\hat{\phi}_0}\right)^\lambda, \quad (B9)$$

whereas $$V_s^2(0, \phi) = \frac{K_g}{\rho}\frac{3(1-2v_m)}{2(1+v_m)}\beta = \frac{K_g}{\rho}\frac{3(1-2v_m)}{2(1+v_m)}\left(1-\frac{\phi}{\hat{\phi}_0}\right)^\lambda. \quad (B10)$$

So, $$V_s(\phi_{flt}, \phi) = V_s(0, \phi+\phi_{flt}). \quad (B11)$$

Hence, for this case (i.e. $R_\rho=1=R_K$), so long as $\phi_{flt} \ll \phi$ (i.e. for not too large values of $\phi_{flt}$), the removal of some grains from the load-bearing matrix increasing the rock or structural porosity and introducing them into the pore fluid approximately transforms one point on the $V_s$ vs $V_p$ curve to another point on that same curve.

The invention claimed is:

1. A method for improving prediction of the viability of potential petroleum reservoirs by determining improved estimates of reservoir permeability, the method comprising the steps of:
    (a) assembling measurements of P-wave velocity and density or porosity for a region of porous sedimentary rock to be modelled,
    (b) modelling the porous rock as a system consisting of a load-bearing solid matrix with pores containing fluids and also non-load-bearing solids, the proportion of solid material consisting of non-load bearing solids being represented by a floating solid fraction,
    (c) estimating a value for the floating solid fraction on the basis of the measurements of P-wave velocity and density or porosity, and the porous rock model,
    (d) determining an estimate of permeability as a function of porosity and estimated floating solid fraction, and
    (e) using the determined function to estimate reservoir permeability based on measured values of porosity and the estimated floating solid fraction.

2. A method as claimed in claim 1, wherein step (b) consists of modelling the porous rock as a closed system with a connected pore space occupied by pore fluid with a single pore pressure and including grains of non-load-bearing solid material in the pore space, the proportion of solid material consisting of non-load-bearing grains being represented by the floating solid fraction.

3. A method as claimed in claim 1, wherein step (d) further comprises the steps of:
    assembling measurements of permeability and porosity of core samples from the region, and
    using the estimated floating solid fraction in a regression of measured permeability and porosity to determine an estimate of permeability as a function of porosity and estimated floating solid fraction.

4. A method as claimed in claim 2, wherein determining the estimate of permeability as a function of porosity and estimated floating solid fraction comprises fitting the measurements of permeability and porosity and the estimated floating solid fraction to a function of the form:

$$\log(k)=A\phi-B\phi_{flt}-C$$

where k is the permeability, $\phi$ is the porosity of the rock and $\phi_{flt}$ is the estimated floating solid fraction.

5. A method as claimed in claim 2, wherein the regression of measured permeability and porosity is a regression of logarithmic permeability and porosity, using measured permeability and porosity values corresponding to a plurality of different values of estimated floating solid fraction.

6. A method as claimed in claim 1, wherein the measurements of P-wave velocity and density or porosity comprise wireline log measurements.

7. A method as claimed in claim 1, wherein step (c) comprises fitting the measurements of P-wave velocity and density or porosity to the porous rock model.

8. A method as claimed in claim 1, wherein modelling the porous rock comprises modelling the rock as a first solid component with a second solid component dispersed in the rock, a fraction of the second component consisting of load bearing grains substituted for grains of the first component, and the rest of the second component existing in the pore space but not attached to the first component, the proportion of the second component not attached to the first component comprising the floating solid fraction.

9. A method as claimed in claim 1, wherein modelling the porous rock includes modelling the bulk modulus of the suspension in the pore space as a function of the bulk modulus of the pore fluid, the bulk modulus of the second component, the porosity of the porous rock and the floating solid fraction.

10. A method as claimed in claim 1, wherein modelling the porous rock includes modelling the matrix bulk modulus of the porous rock as a function of the matrix porosity using a critical scaling model, the matrix porosity being defined as the sum of the porosity of the rock and the floating solid fraction.

11. A method for improving prediction of the viability of potential petroleum reservoirs by determining improved estimates of reservoir permeability, the method comprising the steps of:
   (a) assembling measurements of P-wave velocity and density or porosity for a region of porous sedimentary rock to be modelled,
   (b) modelling the porous rock as a system consisting of a load-bearing solid matrix with pores containing fluids and also non-load-bearing solids, the proportion of solid material consisting of non-load bearing solids being represented by a floating solid fraction,
   (c) estimating a value for the floating solid fraction on the basis of the measurements of P-wave velocity and density or porosity, and the porous rock model,
   (d) determining an estimate of permeability as a function of porosity and estimated floating solid fraction,
   (e) modelling the porosity as a function of the floating solid fraction, the effective compaction stress, defined as the difference between externally applied stress and the pore pressure, and a capture fraction representing the fraction of grains becoming part of the load supporting matrix during formation of the rock,
   (f) estimating the capture fraction,
   (g) estimating the effective stress, and
   (h) using the determined permeability function and the modelled porosity function to estimate reservoir permeability based on measured values of porosity obtained using seismic reflectivity.

12. A method as claimed in claim 11, wherein step (b) consists of modelling the porous rock as a closed system with a connected pore space occupied by pore fluid with a single pore pressure and including grains of non-load-bearing solid material in the pore space, the proportion of solid material consisting of non-load-bearing grains being represented by the floating solid fraction.

13. A method as claimed in claim 11, wherein step (d) further comprises the steps of:
   assembling measurements of permeability and porosity of core samples from the region, and
   using the estimated floating solid fraction in a regression of measured permeability and porosity to determine an estimate of permeability as a function of porosity and estimated floating solid fraction.

14. A method as claimed in claim 11, wherein the capture fraction is estimated by regressing measured data from the region to determine a fit to the modelled porosity function.

15. A method as claimed in claim 11, wherein the porosity is modelled using the equation:

$$\phi = -\frac{\phi_{flt}}{1-f_c} - A(1 - e^{-P_e/P_o}) + B,$$

where $\phi$ is the porosity of the rock, $\phi_{flt}$ is the floating solid fraction, $f_c$ is the capture fraction, $P_e$ is the effective stress, and A, B and $P_o$ are positive constants, and the measured data is regressed to determine the capture fraction and positive constants.

16. A computer readable medium on which is recorded a computer program, wherein the program causes the computer to execute the method steps of claim 1 or claim 11.

* * * * *